US012665966B2

(12) United States Patent
    Zilka

(10) Patent No.: US 12,665,966 B2
(45) Date of Patent: *Jun. 23, 2026

(54) SYSTEM AND METHOD FOR PROVIDING A NOTIFICATION THAT A MOBILE DEVICE IS STILL IN AN AUTONOMOUS VEHICLE AFTER DETECTING AN ARRIVAL AT A DESTINATION

(71) Applicant: Uber Technologies, Inc., San Francisco, CA (US)

(72) Inventor: Porter Joseph Zilka, Los Gatos, CA (US)

(73) Assignee: Uber Technologies, Inc., San Francisco, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/482,255

(22) Filed: Oct. 6, 2023

(65) Prior Publication Data
    US 2024/0048653 A1    Feb. 8, 2024

Related U.S. Application Data

(63) Continuation of application No. 16/809,442, filed on Mar. 4, 2020, now Pat. No. 11,825,003, which is a
    (Continued)

(51) Int. Cl.
    *H04M 1/72457*    (2021.01)
    *B60Q 5/00*    (2006.01)
    (Continued)

(52) U.S. Cl.
    CPC ........ *H04M 1/72457* (2021.01); *B60Q 5/005* (2013.01); *B60Q 9/00* (2013.01); *G06F 3/0482* (2013.01); *H04M 1/72412* (2021.01);

*H04W 4/029* (2018.02); *H04W 4/48* (2018.02); *H04W 4/80* (2018.02); *G05D 1/0088* (2013.01)

(58) Field of Classification Search
    CPC ......... H04M 1/72457; H04M 1/72412; H04M 1/6091; B60Q 5/005; B60Q 9/00; G06F 3/0482; H04W 4/029; H04W 4/48; H04W 4/80; H04W 4/024
    See application file for complete search history.

(56) References Cited

U.S. PATENT DOCUMENTS 8,787,006 B2    7/2014    Golko et al.
8,948,784 B2    2/2015    Chan et al.
    (Continued)

OTHER PUBLICATIONS

Website, Uber Homepage, available at www.uber.com, visited Nov. 8, 2019.
    (Continued)

*Primary Examiner* — Brandon D Lee
(74) *Attorney, Agent, or Firm* — Schwegman Lundberg & Woessner, P.A.

(57)    ABSTRACT

Under the user's instruction, an autonomous vehicle travels to a selected location. The user chooses a place to arrive at the destination address. After the arrival of the autonomous vehicle, it is determined whether the user's or third party's mobile device is still in the vehicle. If the mobile device is still in the vehicle, the vehicle will notify the user or third party in one or more ways to come back and get their mobile device.

18 Claims, 8 Drawing Sheets

Related U.S. Application Data continuation of application No. 16/679,192, filed on Nov. 9, 2019, now Pat. No. 10,623,553.

(51) Int. Cl.

| | |
|---|---|
| *B60Q 9/00* | (2006.01) |
| *G05D 1/00* | (2024.01) |
| *G06F 3/0482* | (2013.01) |
| *H04M 1/72412* | (2021.01) |
| *H04W 4/029* | (2018.01) |
| *H04W 4/48* | (2018.01) |
| *H04W 4/80* | (2018.01) |

(56) References Cited

U.S. PATENT DOCUMENTS

| | | | |
|---|---|---|---|
| 9,648,107 | B1 | 5/2017 | Penilla et al. |
| 9,956,910 | B2 | 5/2018 | McNew |
| 10,156,848 | B1 * | 12/2018 | Konrardy ............ G07C 5/0841 |
| 10,351,143 | B2 | 7/2019 | Mueller et al. |
| 10,390,177 | B2 | 8/2019 | Chen et al. |
| 2007/0109120 | A1 | 5/2007 | Schaefer |
| 2011/0117933 | A1 * | 5/2011 | Andersson ......... G01C 21/3688 |
| | | | 455/456.2 |
| 2015/0156567 | A1 | 6/2015 | Oliver et al. |
| 2015/0177362 | A1 | 6/2015 | Gutierrez et al. |
| 2018/0072321 | A1 | 3/2018 | Mueller et al. |
| 2018/0075721 | A1 | 3/2018 | Oliver et al. |
| 2018/0293872 | A1 * | 10/2018 | Guo ................ H04M 1/724098 |
| 2018/0359604 | A1 * | 12/2018 | Chen ................... H04W 64/003 |
| 2018/0374076 | A1 | 12/2018 | Wheeler |
| 2019/0053022 | A1 | 2/2019 | Chatterjee |
| 2020/0005059 | A1 * | 1/2020 | Yamada ................. G08B 21/24 |
| 2020/0202149 | A1 * | 6/2020 | Zhang ..................... G08B 7/06 |
| 2021/0311478 | A1 | 10/2021 | Pierfelice |

OTHER PUBLICATIONS

"U.S. Appl. No. 16/679,192, PreInterview First Office Action mailed Jan. 16, 2020", 6 pgs.

"U.S. Appl. No. 16/679,192, Response filed Jan. 22, 2020 to PreInterview First Office Action mailed Jan. 16, 2020", 17 pgs.

"U.S. Appl. No. 16/679,192, Notice of Allowance mailed Feb. 27, 2020", 12 pgs.

"U.S. Appl. No. 16/809,442, Non Final Office Action mailed Nov. 25, 2022", 33 pgs.

"U.S. Appl. No. 16/809,442, Response filed Apr. 21, 2023 to Non Final Office Action mailed Nov. 25, 2022", 9 pgs.

"U.S. Appl. No. 16/809,442, Notice of Allowance mailed Jul. 6, 2023", 14 pgs.

"U.S. Appl. No. 16/809,442, 312 Amendment filed Sep. 19, 2023", 10 pgs.

"U.S. Appl. No. 16/809,442, PTO Response to Rule 312 Communication mailed Sep. 28, 2023", 2 pgs.

* cited by examiner

1

200

301

302

303

304

SYSTEM AND METHOD FOR PROVIDING A NOTIFICATION THAT A MOBILE DEVICE IS STILL IN AN AUTONOMOUS VEHICLE AFTER DETECTING AN ARRIVAL AT A DESTINATION

RELATED APPLICATIONS

The present application is a continuation of, and claims priority to U.S. patent application Ser. No. 16/809,442, titled "LOST MOBILE DEVICE NOTIFICATION APPARATUS AND METHOD FOR AN AUTONOMOUS VEHICLE," filed Mar. 4, 2020, which in turn is a continuation of, and claims priority to U.S. patent application Ser. No. 16/679, 192, titled "SYSTEM AND METHOD FOR PROVIDING A NOTIFICATION THAT A MOBILE DEVICE IS STILL IN AN AUTONOMOUS VEHICLE AFTER DETECTING AN ARRIVAL AT A DESTINATION," filed Nov. 9, 2019, which are all herein incorporated by reference in its entirety for all purposes.

FIELD OF THE INVENTION

The present invention relates to vehicles, and more particularly to autonomous vehicles.

BACKGROUND

Right now, autonomous vehicles are becoming more and more relevant. As we start using autonomous vehicles to transport people to different places, problems might occur without any driver. For example, people might leave their phones in the autonomous vehicle and have no humans to give it back.

There is thus a need for addressing these and/or other issues associated with the prior art.

SUMMARY

Under the user's instruction, an autonomous vehicle travels to a selected location. The user chooses a place to arrive at the destination. After the arrival of the autonomous vehicle, it is determined whether the user's or third party's mobile device is still in the vehicle. If the mobile device is still in the vehicle, the vehicle will notify the user or third party in one or more ways to come back and get their mobile device.

DETAILED DESCRIPTION

Figure 1:
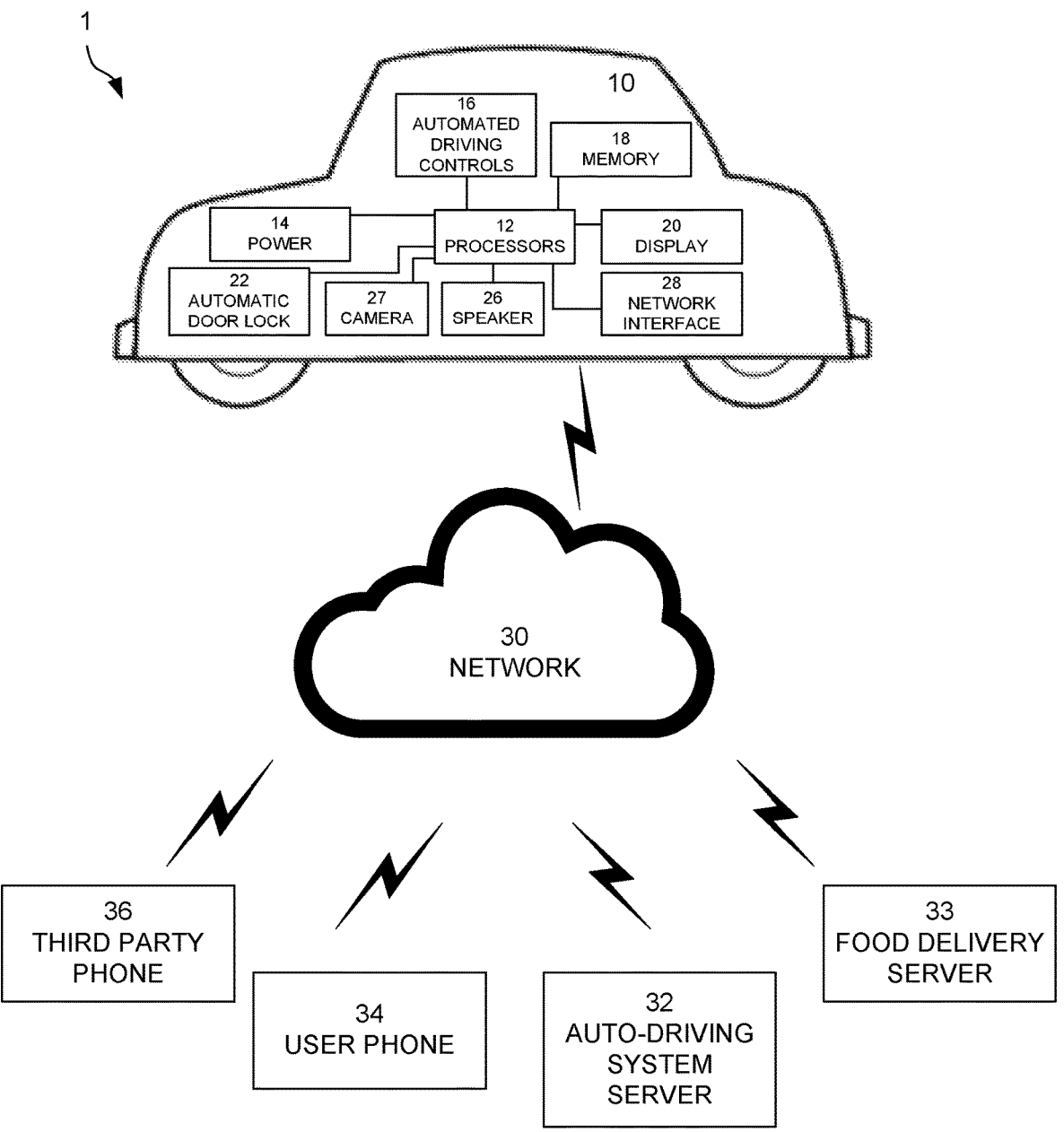
FIG. 1 illustrates an autonomous vehicle system 1, in accordance with one embodiment.

FIG. 1 illustrates an autonomous vehicle system 1, in accordance with one embodiment.

As shown in FIG. 1, provided is a vehicle 10 that includes a processor 12 connected to a power source 14, an automated driving controller 16, memory 18, a display 20, a network interface 28 for wirelessly communicating with a network 30, one or more speaker(s) 26, a camera 27, and an automated door lock 22.

In one embodiment, the automated driving controller 16 may control various functions of the vehicle 10 including unillustrated brakes, steering wheel, etc. As shown in FIG. 1, the display 20 is located in a front/middle portion of a dashboard unit (not shown) so it can be accessed by all parties in the self driving vehicle 10. In one embodiment, the power source 14 may be a rechargeable battery that is charged by another power source. Further, one or more of the cameras 27 may located on every door for facial recognition purposes. Similarly, the automated door lock 22 may be on every door for automatically locking and unlocking each door.

As shown in FIG. 1, the memory 18 may be a hard drive, solid state memory, or any other kind of memory in the autonomous vehicle 10 for storing any information needed for the autonomous 10 vehicle to operate. Further, the speakers 26 may be located in every interior and/or exterior corner of the autonomous vehicle 10. Still yet, the network interface 28 may be connected to the network 30 which can provide a communication pathway to a food delivery server 33 and an automated driving system server 32.

As further shown in FIG. 1, a user phone 34 may be connected to the network 30 to allow communication with all of the components shown in FIG. 1 (e.g. the vehicle 10, a third party phone 36, the food delivery server 33, the automated driving system server 32, etc.). The user phone 34 may include multiple applications (e.g. an autonomous vehicle application, a food delivery application, a calendar application, etc.) for communicating with the various components above.

Figure 2A:
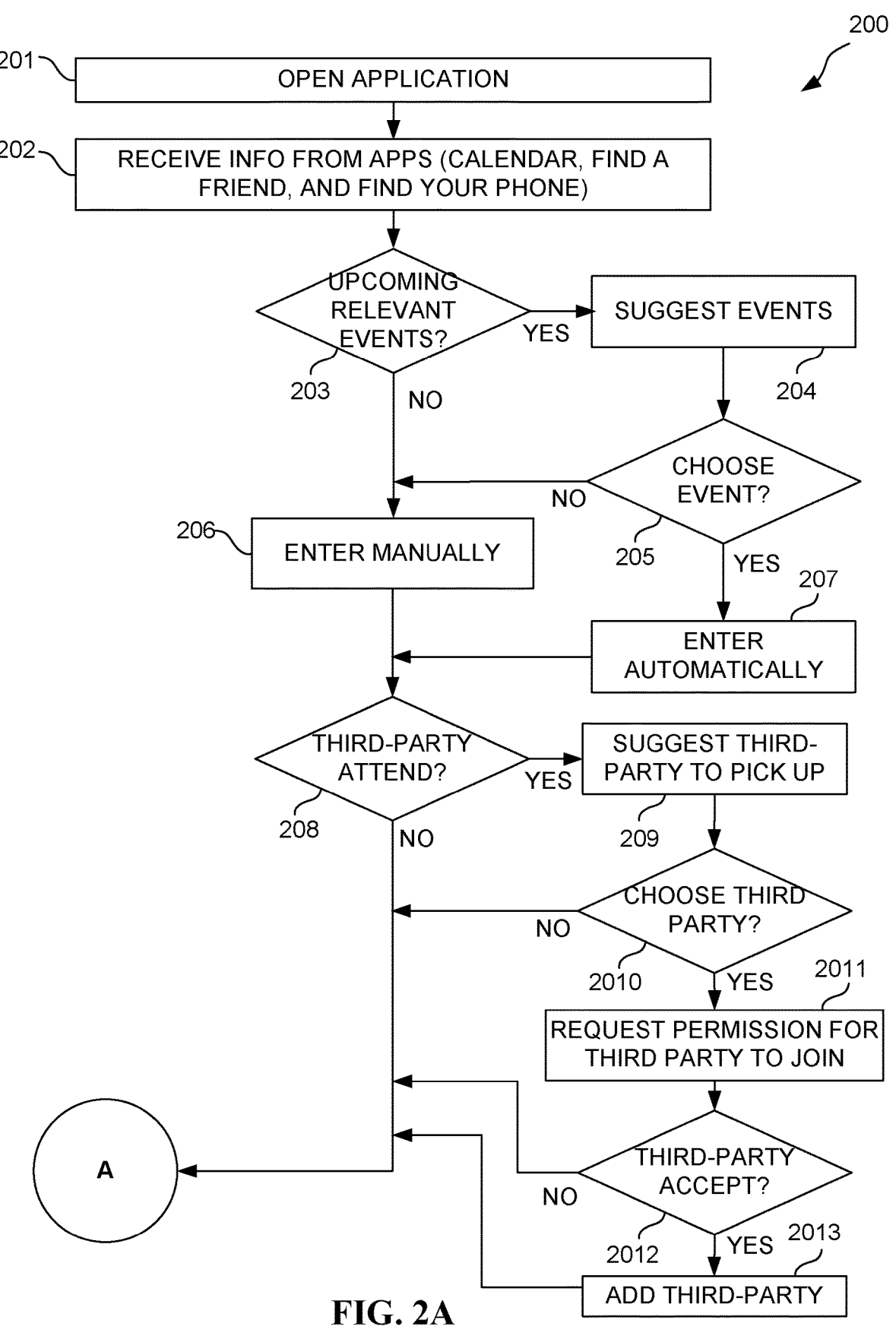
FIG. 2A illustrates a method 200 for operating the autonomous vehicle system 1 of FIG. 1, in accordance with one embodiment.

FIG. 2A illustrates a method 200 for operating the autonomous vehicle system 1 of FIG. 1, in accordance with one embodiment.

As shown in operation 201, a user opens the autonomous vehicle application. In one embodiment, the user can do this by downloading the autonomous vehicle application at an on-line store, and launching it by selecting an icon associated with the application. In another embodiment, the user can access the autonomous vehicle application using a website on a network browser. The contents of the network browser has a similar appearance to the autonomous vehicle application, but instead of downloading the autonomous vehicle application, the user accesses the autonomous vehicle application on the network browser. The website may be built using HTML 5.

In operation 202, the autonomous vehicle application receives information from the memory 18, phone memory, or one of the servers 32, 33, etc. that is stored by the one or more applications mentioned earlier. For example, information may be received that is stored by a calendar application. As another example, information may be received that is stored by a calendar application that is capable of scheduling events with third parties so the user and/or the third parties can decide who they want to pick up, where they want to go, and when they want to go, using the autonomous vehicle system 1. In various embodiments, examples of the calendar application may include iPHONE™ calendar, GOOGLE™ calendar, etc.

In another embodiment, the autonomous vehicle application also receives information from the memory 18, phone memory, or one of the servers 32, 33, etc. that is stored by other applications. For example, information may be received that is stored by a social media or messaging application that is capable of tracking the location of third parties associated with the user, using global positioning system (GPS) system components of phones of the third parties. In various embodiments, examples of the social media or messaging application may include INSTA-GRAM™, FACEBOOK™ messenger, etc. In one embodiment, the third parties may be associated with the user, by being connected to them as social media "friends" or having contact information of the third parties stored in the memory 18, phone memory, or one of the servers 32, 33, etc.

In yet another embodiment, the autonomous vehicle application also receives information from the memory 18, phone memory, or one of the servers 32, 33, etc. that is stored by other applications. For example, information may be received that is stored by a food delivery application that is capable of storing food purchase profiles that each include a date of purchase, who made the purchase, a name and a location of the restaurant that was contacted in the past, what food was purchased and statistics on what food was purchased the most, etc. Such information may be retrieved for the user and/or any third parties by accessing the user phone 34, any third party phone 36, or the food delivery server 33 that communicates with the food delivery application. In various embodiments, examples of the food delivery application may include UBEREATS™, DOORDASH™, etc.

In decision 203, it is determined whether there are any upcoming, relevant calendar events. In one embodiment, the information from the memory 18, phone memory, or one of the servers 32, 33, etc. that is stored by the calendar application (and received in operation 202) is analyzed. For example, a date or time associated with a calendared event may be compared with the current time. If such date or time is within a certain threshold amount (e.g. 1 hour, 2 hours, 3 hours, etc.) of the current date or time, the event may be determined to be relevant.

In another embodiment, the information from the memory 18, phone memory, or one of the servers 32, 33, etc. that is stored by the calendar application (and received in operation 202) may be further analyzed. For example, a location that is associated with a calendared event may be compared with an area where the user lives (physical address), or GPS location of the user phone 34 or any relevant third party phone. If the location is within a certain distance (e.g. 10 mi, 20 mi, 40 mi, 60 mi, etc.) of any of the above, the event may be determined to be relevant.

Figure 3A:
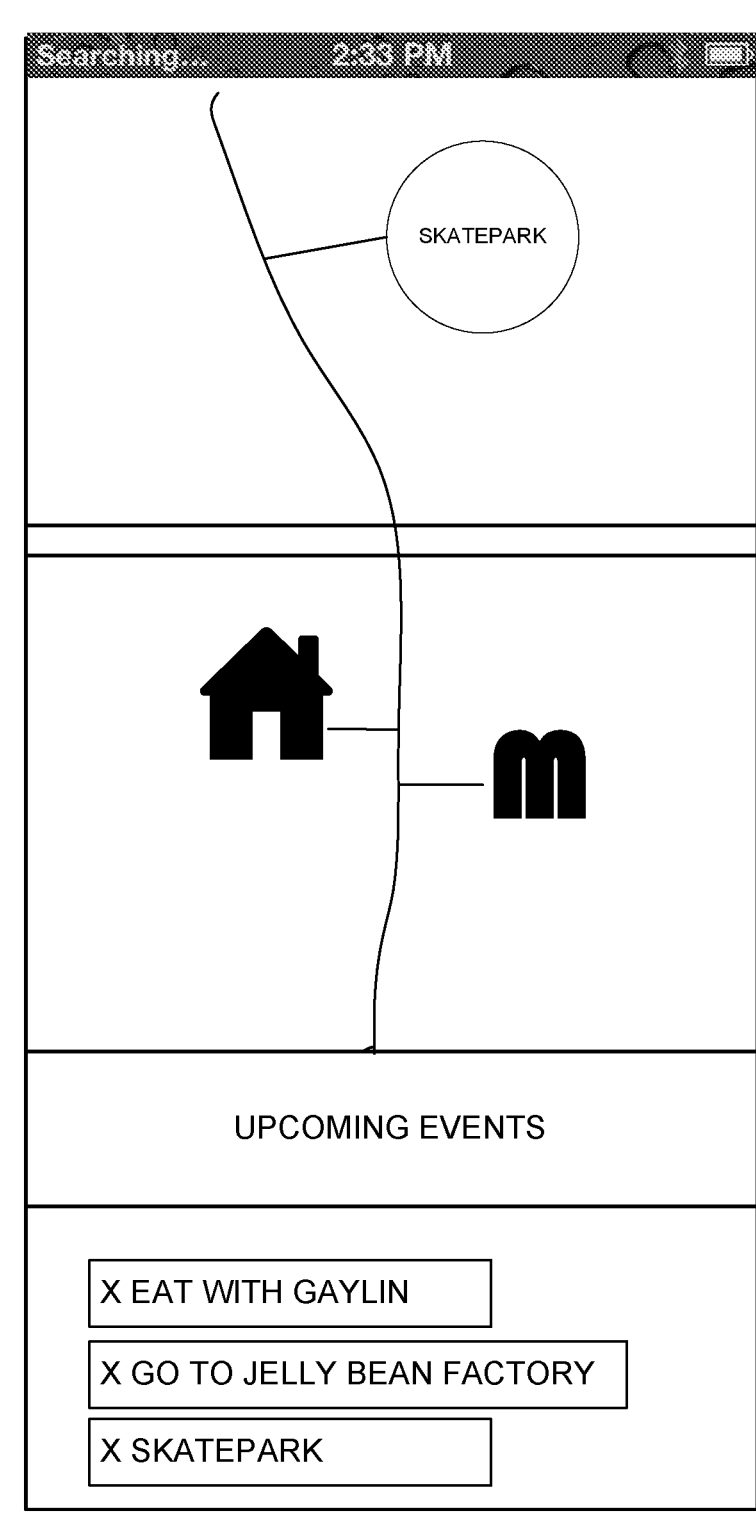
FIG. 3A illustrates an exemplary user interface, in accordance with one embodiment.

If it is determined that there is an upcoming, relevant calendar event, then, in operation 204, the autonomous vehicle application, using the information just acquired, may suggest the identified upcoming, relevant calendar event(s). See user interface 301 of FIG. 3A.

In decision 205, it is determined whether the user chooses one of the upcoming, relevant calendar events suggested in operation 204. If it is determined in decision 205 that the user chooses one of the upcoming, relevant calendar events that are suggested in operation 204, the autonomous vehicle application automatically enters the destination address of the chosen suggested upcoming, relevant calendar event, using the location information stored in the memory 18, phone memory, or one of the servers 32, 33, etc. by the calendar application. See operation 207.

If it is determined in decision 205 that the user does not choose one of the upcoming, relevant calendar events that is suggested in operation 204, then the system may allow manual entry in operation 206. In operation 206, the user is permitted to enter the address manually and press enter, for sending the manually-entered address to the automated driving system server 32 that cooperates with the autonomous vehicle application on the user phone 34.

If it is determined in decision 205 that the user does choose one of the upcoming, relevant calendar events that is suggested in operation 204, then the application uses the destination of the calendar event that the user picked and locates the corresponding street address (if necessary) and sends it to the automated driving system server 32 using the network 30. In one embodiment, the method 200 reserves the autonomous vehicle 10 even thought the method 200 may continue as follows (with the user not being ready to depart), so that the autonomous vehicle 10 can start its travel toward the user while the user continues interacting with the autonomous vehicle application, in the manner set forth below.

In decision 208, the autonomous vehicle application determines if there are any third parties to attend the upcoming relevant event that was chosen in operation 207, so that such third parties may be suggested for pick up by the autonomous vehicle 10 while in route to the destination. Specifically, the autonomous vehicle application may analyze the information from the calendar application and determine which third parties, if any, are scheduled to attend the event that is suggested in operation 204 and selected in operation 207.

In one embodiment, if there is any third party identified for the suggested/selected event, the autonomous vehicle application may receive information from the messaging and/or social media application to determine where the third party is currently residing. Using such information just recently gathered, the autonomous vehicle application may determine if it is possible/feasible to pick up the third party while in route to the destination. For example, the autonomous vehicle application may compare the event location (from the information from the memory 18, phone memory, or one of the servers 32, 33, etc. that is stored by the calendar application), with the location where the third party resides (physical address), or GPS location of the mobile device of the third party. If the location of the third party is within a certain threshold (e.g. 10 mi, 20 mi, 40 mi, 60 mi, etc.) of the user, the event location, and/or a present location of an available autonomous vehicle; it may be suggested in operation 209 that such third party should be picked up. In another embodiment, operation 209 may require, before such suggestion, that the third party be between the location of the user and the location of the suggested/selected event (address).

Figure 2B:
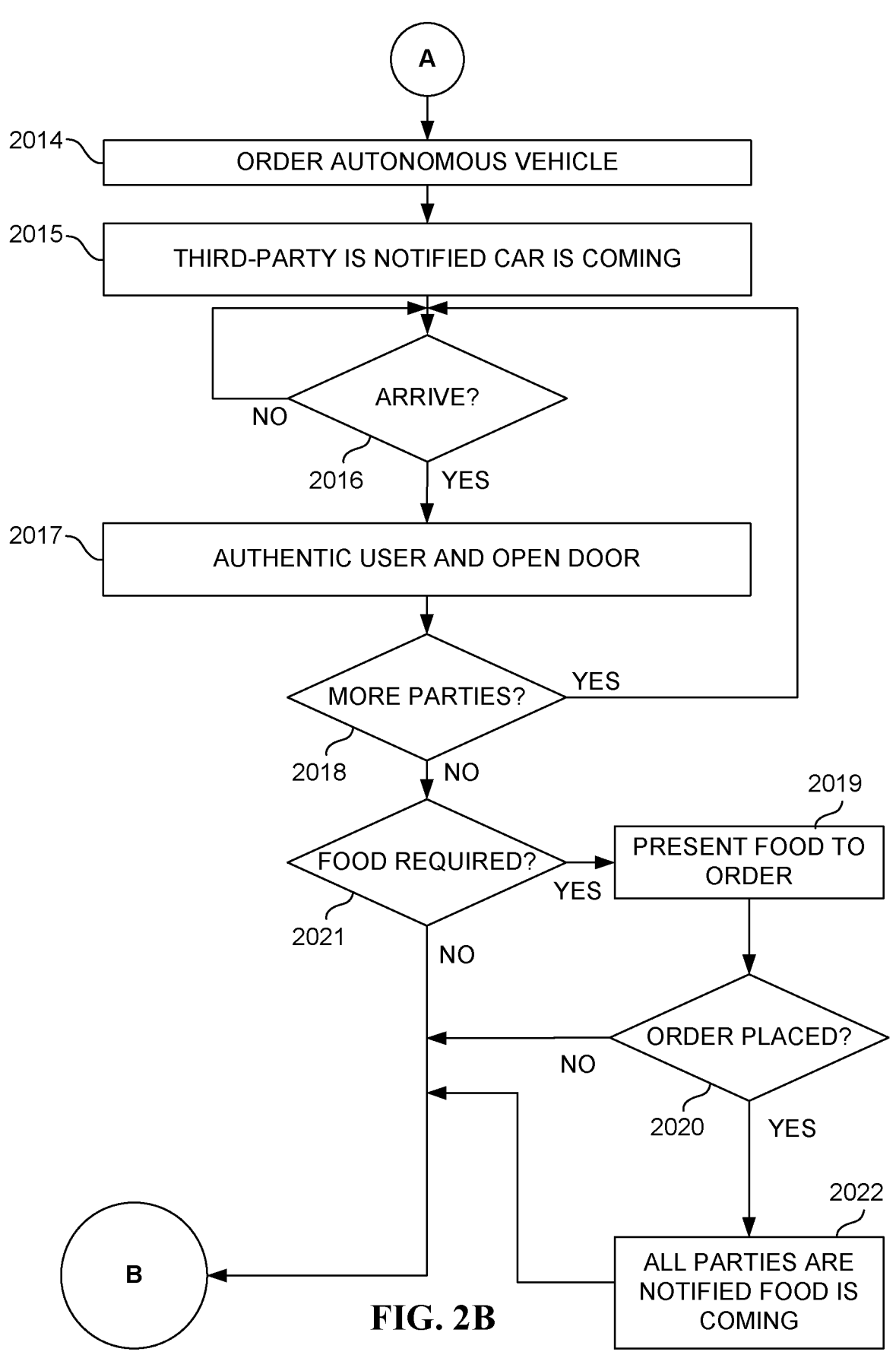
FIG. 2B illustrates a continuation of the method 200 shown in FIG. 2A, in accordance with one embodiment.

As shown, if, in decision 208, the autonomous vehicle application determines that there are not any third parties to suggest to pick up, the autonomous vehicle application may simply request the autonomous vehicle to pick up the user at the user's current location, in operation 2014 (shown in FIG. 2B).

Figure 3B:
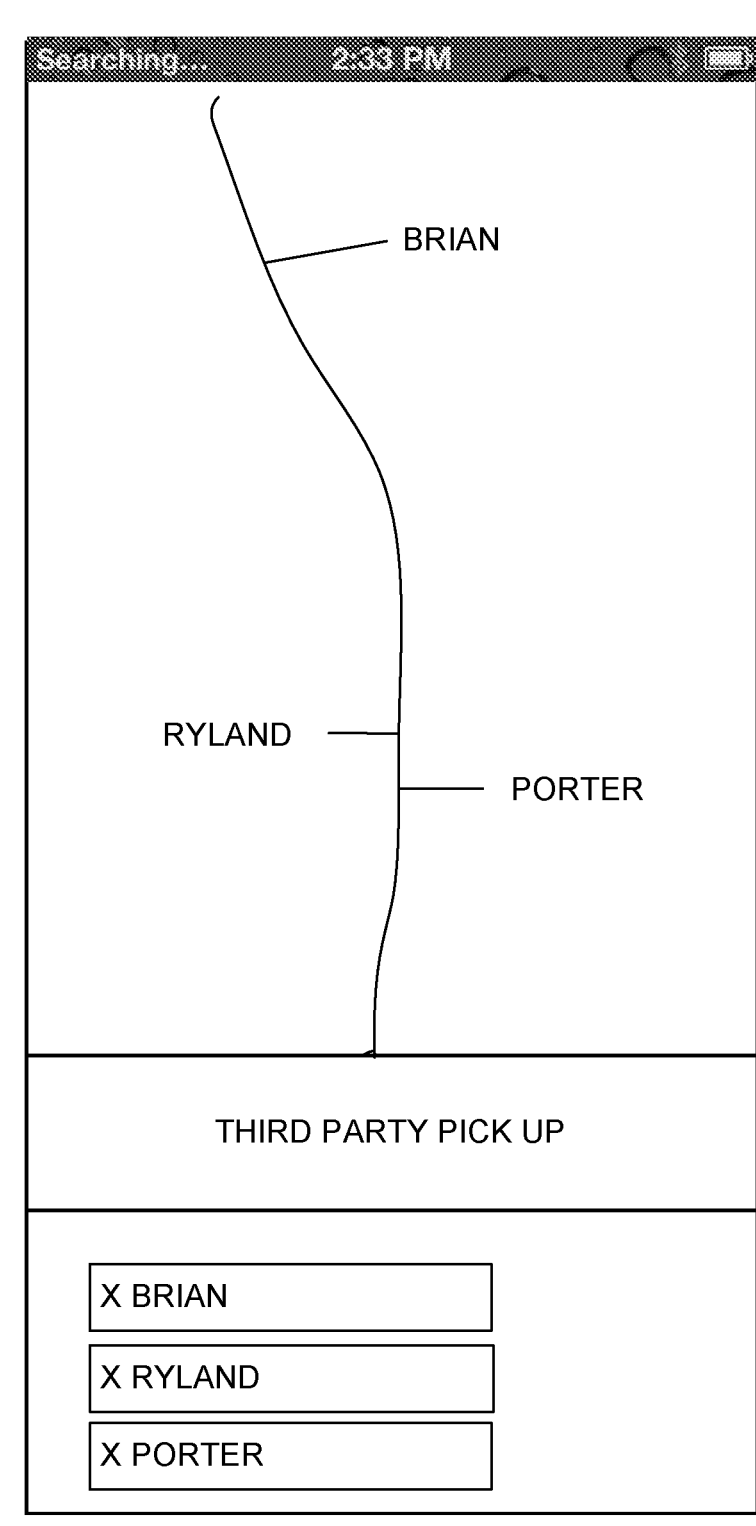
FIG. 3B illustrates another exemplary user interface, in accordance with one embodiment.

If, on the other hand, in decision 208, the autonomous vehicle application determines that there are any third parties to suggest to pick up, such third party pick up may be suggested, in operation 209. See, for example, user interface 302 of FIG. 3B.

Figure 3C:
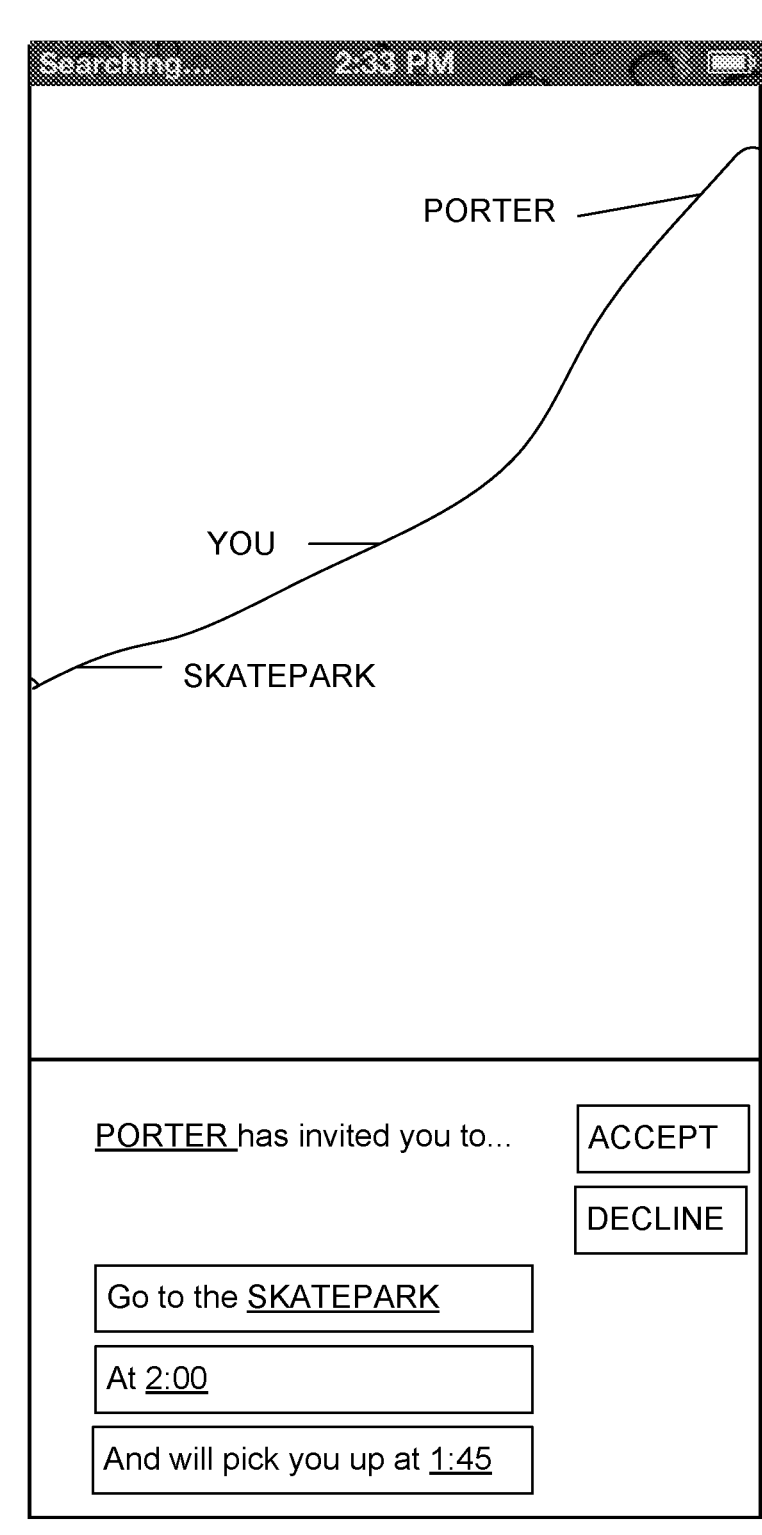
FIG. 3C illustrates another exemplary user interface, in accordance with one embodiment.

In decision 2010, it is determined whether the user chooses one or more of the suggested third parties for pickup. If it is determined in decision 2010 that the user does not choose one or more of the suggested third parties for pickup, the autonomous vehicle application may simply request the autonomous vehicle 10 to pick up the user at the user's current location, in operation 2014 (shown in FIG. 2B). If it is determined in decision 2010 that the user does choose one or more of the suggested third parties for pickup, a request is sent to the third party(ies) for permission to get picked up. See operation 2011. In one embodiment, the autonomous vehicle application initiates a message that is sent to the third party phone 36 so that the request is displayed on the third party phone 36. See, for example, user interface 303 of FIG. 3C.

In decision 2012, it is determined whether the third party accepts the request sent in operation 2011. If it is determined that the third party does not accept the request sent in operation 2011, the autonomous vehicle application may simply request the autonomous vehicle to pick up the user at the user's current location, in operation 2014 (shown in FIG. 2B). If, on the other hand, it is determined that the third party does accept the request sent in operation 2011, the autonomous vehicle application enters the current location of the third party to arrange pick up of both the user and the third party before arriving at the destination identified in the calendar event. See operation 2013.

In one embodiment, the third party could be between the autonomous vehicle and the user so the third party could be picked up first. In another embodiment, the user could be between the autonomous vehicle and the third party so the user could be picked up first.

FIG. 2B illustrates a continuation of the method 200 shown in FIG. 2A, in accordance with one embodiment.

In operation 2014, the vehicle is requested by the autonomous vehicle application to come to the location of the user or the third party, depending on which is closer. In one embodiment, the autonomous vehicle application sends a signal to a server which commands the autonomous vehicle 10 to drive to the appropriate location.

In operation 2015, the user and/or third party are notified that the autonomous vehicle is coming. In one embodiment, the autonomous vehicle application sends a message or notification to the user and/or third party mobile devices 34, 36 so that they can see the message or notification and are notified.

In decision 2016, it is determined whether the autonomous vehicle 10 has arrived. In one embodiment, this may be accomplished by comparing the location of the autonomous vehicle 10 and the location of the user and/or third party mobile device 34, 36. If it is determined that the autonomous vehicle 10 has not arrived, the decision 2016 polls.

If, on the other hand, it is determined that the autonomous vehicle 10 has arrived, the user and/or third party is authenticated in operation 2017 before a door of the autonomous vehicle 10 is automatically opened for the user and/or third party, using the automatic door lock 22. In one embodiment, this authentication prevents another person from taking the autonomous vehicle 10.

In one embodiment, this authentication of operation 2017 can be accomplished using facial recognition. For example, the user and/or third party may be required to provide a profile picture to the automated driving system server 32 via the appropriate phone 34, 36, so that such picture may be compared to a face of the user and/or third party that is taken by using the camera 27 of the autonomous vehicle 10. As another example, if a profile picture is not used, the autonomous vehicle 10 may use photos from social media and/or photos stored on the user's mobile device 32 to recognize the face of the user and/or third party when being picked up by the autonomous vehicle 10.

In another embodiment, this authentication of operation 2017 can be accomplished using location information. For example, a GPS-determined location of the autonomous vehicle 10 can be compared to a GPS-determined location of the mobile device of the user and/or third party 32, 34.

In yet another embodiment, the authentication of operation 2017 can be accomplished using wireless connectivity. For example, it may be determined whether short range wireless connectivity (e.g. Bluetooth, etc.) exists between the autonomous vehicle 10 and the mobile device of the user and/or third party 32, 34. Specifically, if a short range wireless connection is established between the autonomous vehicle 10 and the mobile device of the user and/or third party 32, 34, an exchange of information may be used to determine that the user and/or third party is at the location of the autonomous vehicle 10.

In any case, if it is determined that the autonomous vehicle has arrived and the user and/or third party is authenticated by any or more or all of the methods described above in operation 2017, the autonomous vehicle 10 automatically opens a door of the autonomous vehicle 10 for the user and/or third party, using the appropriate automated door lock 22.

As an option, if the autonomous vehicle 10, through its camera(s) 27 observes that there are two people (e.g. the third party and user are on two sides of the autonomous vehicle) the autonomous vehicle 10 opens two doors at once to let the user and third party in. If the user and third party are observed to entry on one side of the autonomous vehicle 10 (e.g. there was a curb on only one side) the autonomous vehicle application could notify the user that there was a curb on one side and open only one door (e.g. one on the side of the curb) so that the user and/or third party does not attempt to enter on the side of the autonomous vehicle 10 where traffic is active.

In decision 2018, it is determined whether there are more parties to pickup. If it is determined that there are more parties to pickup in decision 2018, operations 2016-2017 are repeated. If it is determined that there are no more parties to pickup, the autonomous vehicle application determines whether food is required at the destination per decision 2021.

In one embodiment, the autonomous vehicle application determines whether food is required at the destination in decision 2021, by reviewing text in the calendar information received in operation 202 to determine if food is necessary. For example, the autonomous vehicle application may analyze the calendar information to search for words such as "food," "breakfast," "lunch," "dinner," etc.

In another embodiment, the autonomous vehicle application determines whether food is required at the destination in decision 2021, by reviewing a current time. If the current time is within standard time frames associated with breakfast, lunch, dinner, etc., it may be determined that that food is required in decision 2021.

If, in decision 2021, the autonomous vehicle application determines that it is time to eat, it is then determined whether there are any relevant restaurants within a predetermined distance from the destination and/or route to the destination. If it is determined that there are any relevant restaurants within the predetermined distance from the destination and/or route to the destination, the autonomous vehicle application may send a request to the user and/or third parties to determine if they want to eat at the destination per operation 2019. In one embodiment, the request may simply present all of the relevant restaurants within the predetermined distance from the destination and/or route to the destination.

In one embodiment, the autonomous vehicle application may analyze the user's and/or third parties' profiles from their food delivery application, and then makes suggestions based on various criteria. For example, the autonomous vehicle application may compare the delivery time of all the above described restaurants and the time frame of the event. For example, if one restaurant can deliver food at 7:00 and the event is from 1:00 to 5:00 then that restaurant would not be a suitable choice.

As another example, the autonomous vehicle application may compare the distance of the delivery area of the restaurants with the location at the calendared event takes place. If the restaurant is within a predetermined distance (e.g. on the same block of the event, etc.), for example, the autonomous vehicle application may decide that such be a suitable restaurant.

As yet another example, the autonomous vehicle application may inspect the user's and the third parties' food delivery application profiles and identify places where the user and/or third parties shop the most. For example, if the user likes Burger King™ and PF Chang's™ and the third parties like PF Chang's™ and Wendy's™, the autonomous vehicle application may suggest PF Chang's™. The autonomous vehicle application may do the same for other people who are going to the event (other than the user and/or third parties).

Then, the autonomous vehicle application may present, using the information just gathered, the food that may be ordered. In decision 2020, the user and/or third party may be given the opportunity to order the food just presented. If the user and/or third party do not order the food, the method 200 continues in FIG. 2C. If, on the other hand, the food is ordered, the user and/or third party may be notified that food is coming per operation 2022 via the mobile devices 34, 36.

Figure 2C:
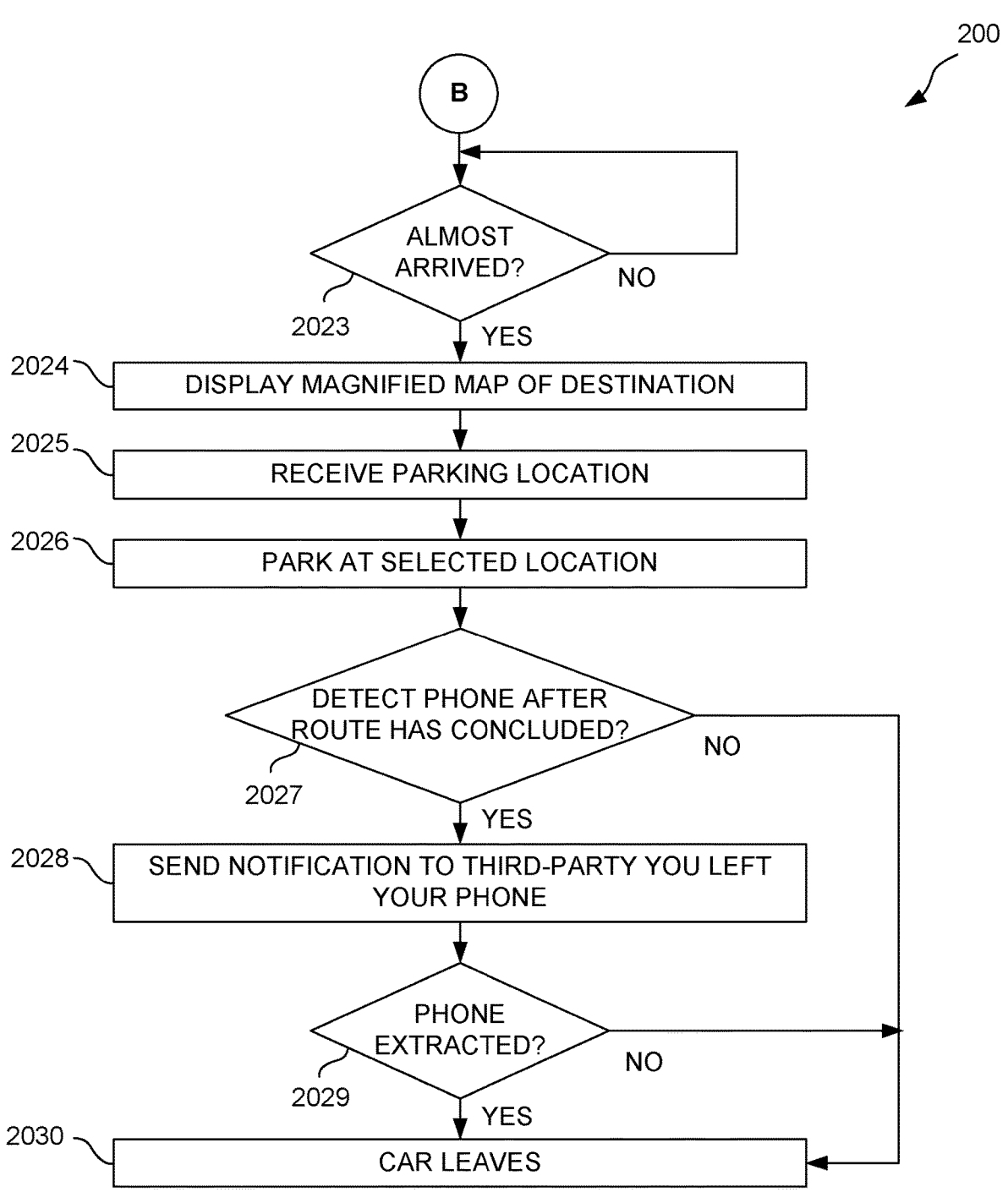
FIG. 2C illustrates a continuation of the method 200 shown in FIGS. 2A-2B, in accordance with one embodiment.

FIG. 2C illustrates a continuation of the method 200 shown in FIGS. 2A-2B, in accordance with one embodiment.

As shown, it is determined, in decision 2023, by the autonomous vehicle application whether the autonomous vehicle 10 has almost arrived at the destination. If it is determined that the autonomous vehicle 10 has not arrived in decision 2023, the decision 2023 polls. If, on the other hand, the autonomous vehicle 10 has arrived, operation 2024 is performed.

In operation 2024, the autonomous vehicle application displays a magnified map of the location were the autonomous vehicle 10 can park (e.g. parking lot, street parking spots, curb, etc.). In one embodiment, the autonomous vehicle application displays to the user a selectable/movable colored pin on the map so that the user may place the pin at a point where the automobile vehicle 10 should park.

Figure 3D:
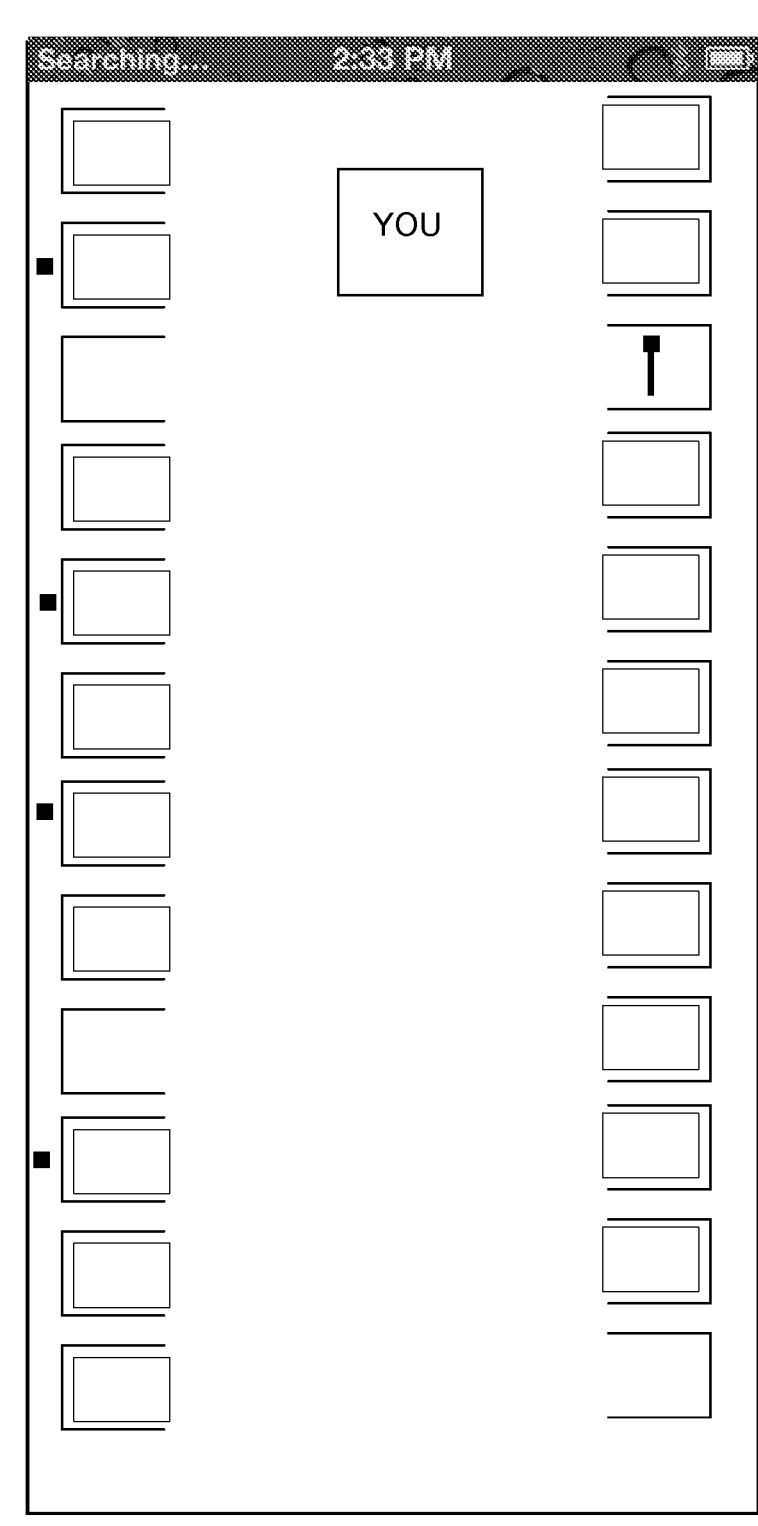
FIG. 3D illustrates another exemplary user interface, in accordance with one embodiment.

In another embodiment, sensors of the autonomous vehicle 10 (or even sensors of other vehicles) may automatically identify open parking spots and communicate such information to the autonomous vehicle application for display on the map, so that the open parking spots may be selected via the map, without having to look out the window of the autonomous vehicle 10. See interface 304 of FIG. 3D.

The autonomous vehicle 10 may also display the map of parking spaces on the display 20. The user and/or third parties may also point where they want to park, for example, using voice control. For example, the user and/or third parties could say "park over by the bank" and autonomous vehicle 10 may park in a spot open near the bank. Regardless as to how the user inputs a desired parking spot, in operation 2025, the autonomous vehicle 10 may receive the user-specified spot to park from the autonomous vehicle application.

In operation 2026, the autonomous vehicle 10 may park at the selected location and may automatically open the door where it is best to exit. In one embodiment, the sensors of the autonomous vehicle 10 may detect which side of the autonomous vehicle 10 is safe for exit. It may do this by receiving information from the exterior cameras 24 (e.g. their is an obstacle right next to where the autonomous vehicle 10 parked so the autonomous vehicle application may send the user a notification that they can not exit on the side of the obstacle).

In decision 2027, the autonomous vehicle 10 may determine whether the user's phone 34 is still in the autonomous vehicle 10 after drop off. In one embodiment, the autonomous vehicle 10 may determine whether the user's phone 34 is in the autonomous vehicle 10 by comparing location coordinates from the GPS of autonomous vehicle 10, and location coordinates from the GPS of the user's phone 34 (or phone 36). In another embodiment, the autonomous vehicle 10 determines if a wireless connection still exists between the autonomous vehicle 10 and the user's phone 34. In another embodiment, the autonomous vehicle application could send the user's phone 34 a request asking if the user left the user's phone 34 in the autonomous vehicle 10. The user may have the choice to say "yes," but if the user does not answer in a certain amount of time, then it may be decided that the user left his or her phone in the autonomous vehicle 10. If the user did not leave his or her phone in the autonomous vehicle 10, operations 2028-2029 may be skipped. If the user did leave his or her phone in the autonomous vehicle 10, the method 200 progresses to operation 2028.

In operation 2028, the autonomous vehicle 10 notifies the user that they left their phone in the autonomous vehicle 10. In one embodiment, the autonomous vehicle 10 may send an audible message through an external autonomous vehicle speaker that audibly indicates that the user left the phone (e.g. "NAMEX, you left your phone in the autonomous vehicle"). In another embodiment, the autonomous vehicle 10 may send a photo of the user's phone 34, showing that it is still in the autonomous vehicle 10 to the third party's device 36. The autonomous vehicle 10 may use the interior camera 27 to do this. As an option, object recognition may be used to determine which photograph (from multiple interior cameras) to send (i.e. send the photograph with a phone recognized in it). In another embodiment, the autonomous vehicle 10 may send a photograph of the user's phone 34 (still in the autonomous vehicle 10) to the third party's device 36.

In another embodiment, the autonomous vehicle 10 may send an instant message to one of the third party's device 36 saying that the user left his or her phone in the autonomous vehicle 10. In another embodiment, the autonomous vehicle 10 may physically follow the user until the user realizes that they lost their phone. Such feature may use the exterior cameras and GPS of the third party's device 36. For example, location coordinates from the GPS of the third party's device 36 may be repeatedly entered into the navigation system of the autonomous vehicle 10 as the location coordinates change, so that the autonomous vehicle 10 can follow the user who is presumably still with the third party.

In decision 2029, the autonomous vehicle 10 determines whether the user's phone 34 is extracted using any of the techniques disclosed above. If extraction is confirmed, the autonomous vehicle 10 may be used by other parties. See operation 2030.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, a system is provided, comprising: an autonomous vehicle configured to travel from an origin to a destination, in response to a user instruction; and an application including one or more programs, wherein the one or more programs are to be executed by one or more processors of a mobile device of a user, the one or more programs including instructions for: receiving user input of the user; in response to receipt of the user input, causing transmission of the user instruction; detecting arrival at the destination; after detecting arrival at the destination, determining whether the mobile device is still in the autonomous vehicle; and in response to determining that the mobile device is still in the autonomous vehicle after detecting the arrival at the destination, causing transmission of a signal to at least one device that is not the mobile device, for providing a notification that the mobile device is still in the autonomous vehicle after detecting the arrival at the destination.

In another embodiment, a non-transitory computer readable storage medium is provided storing one or more programs, the one or more programs comprising instructions which, when executed by a mobile device of a user, cause the mobile to: receive user input of the user; in response to receipt of the user input, cause transmission of the user instruction for use by an autonomous vehicle configured to travel from an origin to a destination in response to the user instruction; detect arrival at the destination; after detecting arrival at the destination, determine whether the mobile device is still in the autonomous vehicle; and in response to determining that the mobile device is still in the autonomous vehicle after detecting the arrival at the destination, cause transmission of a signal to at least one device that is not the mobile device, for providing a notification that the mobile device is still in the autonomous vehicle after detecting the arrival at the destination.

In yet another embodiment, a method is provided, comprising: at a mobile device of a user: receiving user input of the user; in response to receipt of the user input, causing transmission of the user instruction for use by an autonomous vehicle configured to travel from an origin to a destination in response to the user instruction; detecting arrival at the destination; after detecting arrival at the destination, determining whether the mobile device is still in the autonomous vehicle; and in response to determining that the mobile device is still in the autonomous vehicle after detecting the arrival at the destination, causing transmission of a signal to at least one device that is not the mobile device, for providing a notification that the mobile device is still in the autonomous vehicle after detecting the arrival at the destination.

In one embodiment, the determining whether the mobile device is still in the autonomous vehicle, includes comparing a global positioning system (GPS)-determined location of the autonomous vehicle and a GPS-determined location of the mobile device.

In one embodiment, the determining whether the mobile device is still in the autonomous vehicle, includes determining whether short range wireless connectivity exists between the autonomous vehicle and the mobile device.

In one embodiment, the determining whether the mobile device is still in the autonomous vehicle, includes determining whether a message displayed via the application that prompts additional user input, results in no further additional user input being detected.

In one embodiment, the transmission of the signal to at least one device that is not the mobile device, includes transmission of the signal to a speaker of the autonomous vehicle, such that the notification is audible in a proximity of the autonomous vehicle after detecting the arrival at the destination. As an option, the speaker includes an interior speaker inside the autonomous vehicle. As another option, the speaker includes an exterior speaker of the autonomous vehicle.

In one embodiment, the transmission of the signal to at least one device that is not the mobile device, includes transmission of the signal to a wireless network interface of the autonomous vehicle, such that the notification is presented as a visual message.

In one embodiment, the at least one device includes another device of the user of the mobile device.

In one embodiment, the at least one device includes another mobile device of another person other than the user. As an option, the another mobile device of the another person is identified, based on a determination whether the another person accompanied the user in the autonomous vehicle. As another option, the determination whether the another person accompanied the user in the autonomous vehicle is based on a presence of the another person in the autonomous vehicle.

In one embodiment, after the notification that the mobile device is still in the autonomous vehicle after detecting the arrival at the destination, additional user input is received for causing the autonomous vehicle to remain in a proximity of the destination in response thereto.

In one embodiment, after the notification that the mobile device is still in the autonomous vehicle after detecting the arrival at the destination, additional user input is received for causing the autonomous vehicle to remain in a proximity of the user by tracking the user using a camera of the autonomous vehicle.

In one embodiment, after the notification that the mobile device is still in the autonomous vehicle after detecting the arrival at the destination, additional user input is received for causing the autonomous vehicle to travel to an updated location indicated by the additional user input.

In one embodiment, after the notification that the mobile device is still in the autonomous vehicle after detecting the arrival at the destination, additional user input is received for causing the autonomous vehicle to travel to a location of another mobile device.

In one embodiment, after the notification that the mobile device is still in the autonomous vehicle after detecting the arrival at the destination, additional user input is received for causing the autonomous vehicle to travel to a location of another mobile device of another person who accompanied the user in the autonomous vehicle.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data.

However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
a processor; and
a memory storing instructions that, when executed by the processor, configure the system to perform operations comprising:
detecting, by a mobile device, arrival of an autonomous vehicle at a destination address;

in response to detecting arrival of the autonomous vehicle at the destination address, determining that the mobile device is located inside the autonomous vehicle;

in response to determining that the mobile device is located inside the autonomous vehicle, causing transmission, by the mobile device, of a signal notification to a second device indicating that the mobile device is still inside the autonomous vehicle; and based on user input, causing the autonomous vehicle to remain at a predetermined distance from a user of the mobile device by tracking the user using a camera of the autonomous vehicle.

2. The system of claim 1, wherein the determining whether the mobile device is still in the autonomous vehicle, includes comparing a global positioning system (GPS)-determined location of the autonomous vehicle and a GPS-determined location of the mobile device.

3. The system of claim 1, wherein the determining whether the mobile device is still in the autonomous vehicle, includes determining whether short range wireless connectivity exists between the autonomous vehicle and the mobile device.

4. The system of claim 1, wherein the determining whether the mobile device is still in the autonomous vehicle, includes determining whether a message displayed on the application mobile device that prompts additional user input, results in no further additional user input being detected.

5. The system of claim 1, wherein the transmission of the notification to the second device, includes transmission of a signal to a speaker of the autonomous vehicle, such that the notification is audible in a predetermined distance from the autonomous vehicle after detecting the arrival at the destination address.

6. The system of claim 5, wherein the speaker includes an interior speaker inside the autonomous vehicle.

7. The system of claim 5, wherein the speaker includes an exterior speaker of the autonomous vehicle.

8. The system of claim 1, wherein the transmission of the notification to the second device, includes transmission of a signal to a wireless network interface of the autonomous vehicle, such that the notification is presented as a visual message.

9. The system of claim 1, wherein the second device includes another device of the user of the mobile device.

10. The system of claim 1, wherein the second device includes another mobile device of another person other than the user.

11. The system of claim 10, wherein the another mobile device of the another person is identified, based on a determination whether the another person accompanied the user in the autonomous vehicle.

12. The system of claim 11, wherein the determination whether the another person accompanied the user in the autonomous vehicle is based on a presence of the another person in the autonomous vehicle.

13. The system of claim 1, wherein, in response to determining that the mobile device is still in the autonomous vehicle, additional user input is received for causing the autonomous vehicle to remain in a predetermined distance from the destination address in response thereto.

14. The system of claim 1, wherein, in response to determining that the mobile device is still in the autonomous vehicle, additional user input is received for causing the autonomous vehicle to travel to an updated location indicated by the additional user input.

15. The system of claim 1, wherein, in response to determining that the mobile device is still in the autonomous vehicle, additional user input is received for causing the autonomous vehicle to travel to a location of another mobile device.

16. The system of claim 1, wherein, in response to determining that the mobile device is still in the autonomous vehicle, additional user input is received for causing the autonomous vehicle to travel to a location of another mobile device of another person who accompanied the user in the autonomous vehicle.

17. A non-transitory computer readable storage medium storing one or more programs, the one or more programs comprising instructions which, when executed by a processor of a mobile device of a user, cause the mobile device to:

detect, by the mobile device, arrival of an autonomous vehicle at a destination address;

in response to detecting arrival of the autonomous vehicle at the destination address, determining that the mobile device is located inside the autonomous vehicle;

in response to determining that the mobile device is located inside the autonomous vehicle, cause transmission, by the mobile device, of a notification to a second device indicating that the mobile device is still inside the autonomous vehicle; and based on user input, cause the autonomous vehicle to remain at a predetermined distance from a user of the mobile device by tracking the user using a camera of the autonomous vehicle.

18. A method, comprising:

detecting, by a mobile device, arrival of an autonomous vehicle at a destination address;

in response to detecting arrival of the autonomous vehicle at the destination address, determining that the mobile device is located inside the autonomous vehicle;

in response to determining that the mobile device is located inside the autonomous vehicle, causing transmission, by the mobile device, of a notification to a second device indicating that the mobile device is still inside the autonomous vehicle; and based on user input, causing the autonomous vehicle to remain at a predetermined distance from a user of the mobile device by tracking the user using a camera of the autonomous vehicle.

* * * * *